United States Patent [19]

Daviau et al.

[11] Patent Number: 4,755,031

[45] Date of Patent: Jul. 5, 1988

[54] OPTICAL APPARATUS DEHYDRATOR

[76] Inventors: Christopher A. Daviau, 8531 Fensmuir St., San Diego, Calif. 92123; Michael Marcario, 11278 E. Meadow Glen Way, Escondido, Calif. 92025

[21] Appl. No.: 75,124

[22] Filed: Jul. 20, 1987

[51] Int. Cl.$^4$ .............................................. G02B 23/16
[52] U.S. Cl. ..................................... 350/588; 350/537
[58] Field of Search ............... 350/537, 583, 584, 587, 350/588, 589

[56] References Cited

U.S. PATENT DOCUMENTS 2,323,787  7/1943  Bitner .................................. 350/388
2,399,971  5/1946  Wolfe .................................. 350/388

Primary Examiner—John K. Corbin
Assistant Examiner—Martin Lerner
Attorney, Agent, or Firm—Brown, Martin, Haller & Meador

[57] ABSTRACT

An apparatus for controlling the humidity in and removing moisture from the internal volume or optical surfaces of a telescope or similar optical equipment. An apertured desiccant holder is secured to the end of an extension or support means which in turn is mounted to extend through an access port in telescope or equipment housing. The desiccant holder is positioned adjacent to reflective or refractive optics and is constructed to provide ready access and a reasonably short mean free path for moisture to reach the desiccant. In further aspects of the invention, a variety of access ports and equipment dimensions may be accommodated. In addition, the extension means can also incorporate desiccant storage means and a relative moisture indicator for the desiccant.

10 Claims, 1 Drawing Sheet

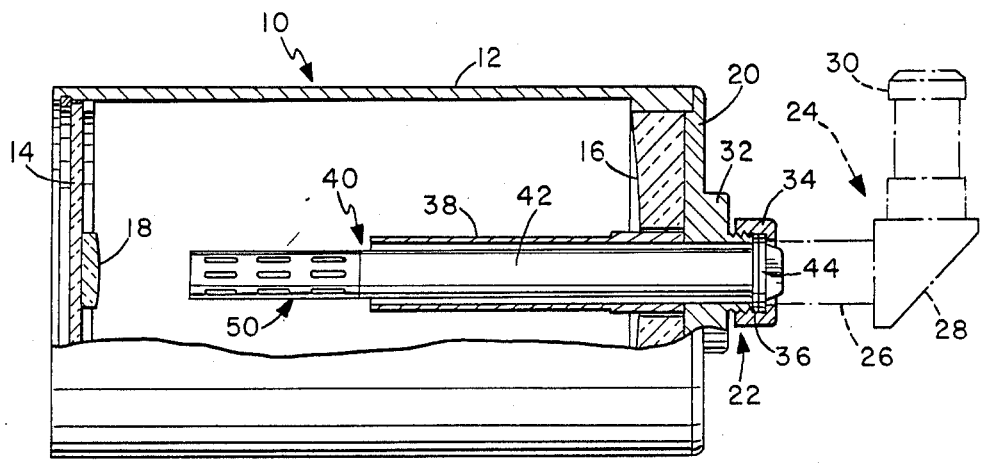
FIG. 1
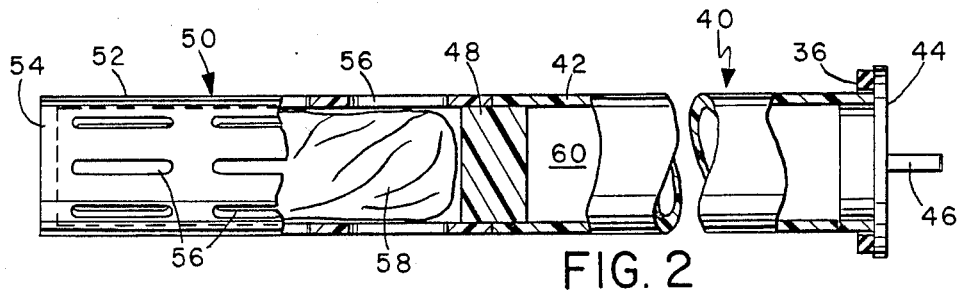
FIG. 2
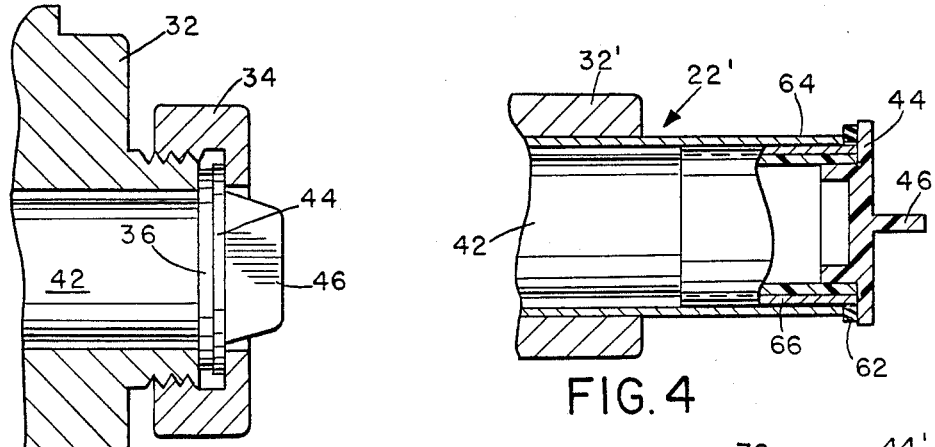
FIG. 3
FIG. 4
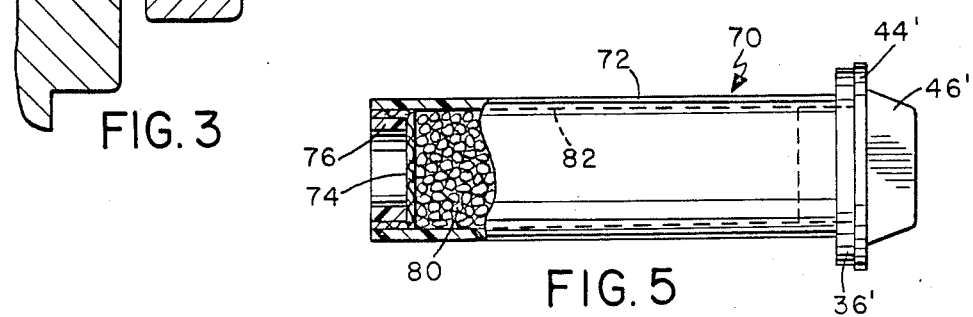
FIG. 5

OPTICAL APPARATUS DEHYDRATOR

FIELD OF THE INVENTION

The present invention relates to optical apparatus and more particularly to an apparatus for removing or controlling the deposition of moisture within the internal volume of optical devices such as telescopes. The invention further relates to a device for removing moisture from the internal volume and surfaces of a telescope which interfaces with existing access ports and positions a desiccant within the telescope.

BACKGROUND OF THE INVENTION

A variety of optical equipment or devices in the general class of telescopes have been used for many years for observing terrestrial and extraterrestrial objects. Telescopic equipment has long been used by amateur and professional observers alike in remote locations to gather general information and data about various stellar or planetary bodies.

The average person thinks of telescopes in terms of the traditional tubular, direct focal optics, Galileo-type telescope. However, while such telescopes allow reasonable resolution or magnification for observation of nearby extraterrestrial objects such as the moon or planets, they are inadequate for refined observations and tracking of more distant objects. A professional or true hobbyist astronomical observer generally employs a much more complex, reflective-type telescopic apparatus. The use of a telescope configured as a cassegrain-type reflector allows greater light capture and higher resolution for improved observations of very small astronomical objects.

At the same time, it is generally necessary to utilize high powered telescopes in a fairly remote location, since "skyglow" from city lights tends to obscure a majority of the distant (visually small) astronomical objects. In addition, it is preferred to make observations from as high an altitude as possible since the density and particulate content of the Earth's lower atmosphere distorts incoming light making accurate detailed observations more difficult. To overcome or minimize such problems, telescope owners often use their equipment in generally remote and possibly high altitude locations. Therefore, a large class of reflective optics telescopes are made for ease of portability.

Portable telescopes of the reflective-type generally have an internal volume on the order of one or more cubic feet and exterior dimensions on the order of six to twenty-four inches in diameter and eighteen to twenty-four or more inches long. The exterior housing or main structure of such telescopes is generally constructed from cast aluminum on the order of 0.125 or more inches thick. Generally there are mounting brackets, counter balance supports, swivel joints, and other associated hardware attached to the telescope which are made from steel, brass, or similar materials. While this presents a reasonably rigid but lightweight structure, it does present a serious problem because of the nature of the remote application or environment.

Most of these telescopes are used in remote locations which have no shelter or environmental control. That means, that the telescope is exposed to the surrounding atmospheric conditions which includes the relative temperature, humidity, and atmospheric contaminates. Since most astronomical observations are by definition made at night, this means that the local temperature of the environment, and the telescope, is generally fairly low. At higher altitudes this is exaggerated by the fact that the temperature generally drops up to five degrees for every additional thousand feet in elevation. Therefore, especially during fall and winter seasons, a telescope may be consistently utilized in temperature below twenty to forty degrees Fahrenheit.

At these temperatures, the large amount of metal utilized in the telescope structure tends to act as a collection surface for moisture. This is due to the natural effect of a cold surface absorbing or trapping moisture due to condensation on the surface. In the past, moisture deposition on the exterior surface of a telescope has been considered little more than a nuisance which can be handled by the judicious use of a few rags, clothes, or telescope covers. The exterior surfaces of any optics or telescope lenses are generally protected by lens covers when not in use and do not collect that large an amount of moisture during use. They can also be easily cleaned. However, more recently it has been discovered that moisture accumulation and deposition is damaging the internal optical surfaces of telescopes. This is due primarily to the utilization of access ports for lenses and camera attachments which allow ready insertion and removal of alternate lenses or cameras for use in observations.

In most of the reflector-type telescopes the focal lens assembly through which reflectors and sub-reflectors present an image are mounted on a tubular assembly which is in turn mounted along a central axis of the telescope. In order to provide adjustability, cleaning, and optical modification of the telescope focusing characteristics, this lens assembly is generally removable. That is, it is mounted through an access port and may be locked in place using a simple friction or slip ring-type fitting which allows easy removal. This type of lens attachment has the advantage that various pieces of photographic equipment can also be inserted in place of the final lenses to capture observed images for later analysis. While this is a standard approach in the art of telescope construction and operation, it does present a serious drawback in the presence of significant amounts of moisture or high humidity.

When the lens assembly is removed from the telescope in a cold environment, which is frequently done to change lenses or insert photographic equipment, moist air is allowed to enter the interior of the telescope. Since the telescope comprises a largely metallic housing and glass optical surfaces, the moist air contacts a large surface area on which moisture readily condenses under typical operating temperatures for telescopes. Therefore, in the normal operation of telescopes a small amount of moisture is often deposited on the inside surfaces during setup, disassembly, or change out activities.

It has been discovered that this moisture does not tend to impair the focal capabilities or light gathering capabilities of the telescope initially or rapidly. A telescope user is not likely to readily notice the presence of a fine layer of moisture. This is typically enhanced by the fact that the moisture is often deposited at the point of disassembly and will dry out during storage of the telescope. However, if the moisture is allowed to reside on the optics for any period of time, even if it evaporates, it damages the optical coatings. The damage results from several processes.

First, the atmosphere is increasingly full of contaminates or pollutants which tend to be either slightly acidic or otherwise reactive with most optical coatings. Atmospheric moisture collects or concentrates these contaminates and deposits them in a fine coating on the optical surfaces where they will slowly degrade the optical coatings. Second, the water itself may naturally contain many minerals or other components which build up over time after many depositions and begin to alter the optical qualities of lenses and reflectors.

It has been discovered with careful observation that a pattern of small "pits" appears on lenses after many exposures to moisture, leading to severe degradation of resolution and light gathering characteristics. It is very expensive to either replace optical coatings or periodically disassemble the entire telecope and clean and maintain the inside. Telescope disassembly and repair is not a do it yourself activity. An untrained individual will ruin the fine alignment and collimation required for high resolution.

What is needed then is a method of preventing the build up of moisture or removing existing moisture that enters the interior of a telescope when an access port or other opening allows substantial free entry of air.

In the past, this might have been accomplished by manufacturing the telescope with some form of desiccant permanently mounted inside. This technique has been used in some binoculars or similar optical equipment. Such a technique is disclosed in U.S. Pat. No. 2,399,971 where small packages of a desiccant are placed in corners of the housing for binoculars at the point of assembly. This technique initially controls moisture deposition on interior optical surfaces at the time of manufacture. However, this technique is useful only in the situation where the housing remains sealed and only a small amount of moisture penetrates the seal. In the typical binocular type application the housing is sealed from the moment of manufacture and never opened again unless damaged or major maintenance is required.

In the case of reflective-type telescopes, the interior and any desiccant stored therein would be repeatedly exposed to new influxes of moisture. The repeated exposure of internal optical surfaces to large amounts of moisture eventually saturates any desiccant located within the telescope. This necessitates dissassembly of the telescope, as before, which is very undesirable. What is needed is a method of absorbing moisture which does not require major disassembly or maintenance of the telescope for continued use.

While evacuation systems or dry gas apparatus might be used to purge the internal atmosphere of a telescope to replace it with "dry" air, this proves far too complex and expensive to provide meaningful protection in the highly portable environment of the telescope art.

Therefore, what is needed is a new type of humidity or moisture control and removal apparatus which is very simple and easy to use, is removable without disassembly of the telescope, is rechargable, and is cost efficient.

SUMMARY

With the above problems and goals in mind, it is an object of the present invention to provide an apparatus for controlling the humidity in a telescope.

It is another object of the present invention to provide an apparatus for removing moisture from the interior of a reflective type telescope with a minimum of complexity.

It is an advantage of the present invention that it provides an apparatus for removing moisture from the interior of a telescope which does not require disassembly or major maintenance of the telescope itself.

It is another advantage of the present invention that it provides an apparatus for removing moisture from a telescope which readily interfaces with a large class of telescopes. Yet another advantage of the present invention is that it provides an apparatus for removing moisture from the interior of a variety of optical equipment or apparatus without disassembly an interference with use. These and other objects, advantages, and purposes are realized in the present invention which provides a moisture control and removal apparatus and method for telescopes and similar optical equipment comprising an elongated support or extension which is dimensioned to fit within an access port for a telescope or similar optical apparatus and which has an interface cap on one end and a desiccant holding means on the opposite end. In a preferred embodiment, the desiccant holding means is a generally cylindrical enclosure having apertured sidewalls for allowing free access of moisture to desiccant stored on the interior of the enclosure. The desiccant holding means is removably secured on the end of the support so that the desiccant may be easily replaced or recharged.

In further aspects of the invention, the support comprises a hollow cylindrical structure, preferably of plastic or low heat conductivity materials, and the cap comprises a plug and handle assembly removably attached to the end of the support. In this configuration, the support means comprises a desiccant storage container for holding unused desiccant in a sealed fashion.

The desiccant material is preferably containerized or confined so that it is removable for recharging. The desiccant material also has a humidity level indicator disposed thereon so that visual observation of the desiccant, such as upon removal of the dehydrator for insertion of other apparatus, provides ready visual indication of the current efficiency of the unit.

BRIEF DESCRIPTION OF THE DRAWINGS

The novel features of the present invention may be better understood from the accompanying description when taken in conjuction with the accompanying drawings in which like characters refer to like parts and in which:

FIG. 1 is a side elevation view of a typical cassegrain type telescope with portions cut away to show the installation of a dehydrator constructed according to the principles of the present invention;

FIG. 2 is an enlarged side elevation view of the dehydrator of FIG. 1 with portions cut away;

FIG. 3 is an enlargement of a portion of FIG. 2, showing one method of retaining the dehydrator of the present invention;

FIG. 4 is a similar view showing the adaption of the dehydrator to a telescope with an adjustable eyepiece holder line; and FIG. 5 is a side elevation view of an alternate embodiment of a dehydrator.

DETAILED DESCRIPTION OF PREFERRED EMBODIMENTS

The present invention provides a method and apparatus for removing or controlling the build up of moisture on the interior surfaces of an optical telescope or other optical apparatus. The invention achieves this by providing a support structure which interfaces with an access port for the telescope to extend and hold in place a dehydration element on the inside of the telescope. The deydration element comprises moisture absorbant material which is supported so that it has a relatively short mean free path to key optical surfaces such as main reflectors. In a preferred embodiment, the support structure provides storage means for holding extra, unexposed desiccant for ready availability.

A cassegrain type optical telescope utilizing a dehydrator constructed according to the principles of the present invention, is illustrated in FIG. 1. In FIG. 1, a cassegrain telescope 10 is illustrated having a sidewall 12 with a portion cut away to show an entry window or lens 14, a main reflector 16, a subreflector 18 and an end wall 20. The telescope 10 illustrates the construction of typical cassegrain type reflective telescopes which have main reflectors varying in size from about four inches to twenty-two inches in diameter. As previously discussed, such telescopes offer very significant light gathering capabilities which provide the ability to focus on very distant stellar objects with increased resolution.

Light from a desired observation target enters the telescope 10 through the annular opening provided by a window or aspheric lens 14 where it is reflected by the main, annular, reflector 16 onto the sub-reflector 18. As is well known and understood in the art, the light collected by the main reflector 16 and focused onto the sub-reflector 18 is in turn focused onto one or more final optical stages supported by the end wall 20 and extending through a central opening in the main reflector. The end wall 20 also serves as a support frame for the main reflector 16 and any associated adjustment hardware.

To support the final focal optics in place, a port 22 is provided through which is generally inserted a focusing optics assembly 24 which typically comprises elements such as an eyepiece holder 26, a mirror or prism diagonal 28, and an eyepiece 30. Although other types of mounting may be used, the port 22 generally comprises a raised edge or boss 32 having a threaded extension on which a threaded ring or annular cap 34 is secured. The ring 34 can also be augmented with a compression washer or fitting 36.

As is typical on this type of telescope, in order to minimize aberrations due to light scattering, and to improve the focal quality of the telescope, a light shield or baffel tube 38 is generally disposed about the path utilized by the focusing optics 24. The baffel tube 38 is configured in the shape of a right handed cylinder or can be tapered to account for the convergence angle of the light reflected from the subreflector 18.

As previously discussed, one purpose of the present invention is to prevent the passage of moisture into the telescope 10 through the port 22 when the optics assembly 24 is removed. The optics assembly 24 may be removed for storage, maintenance, cleaning, or for replacement by camera adapters and the like which are also sized to fit through port 22. Moisture laden air then enters the telescope 10 through the port 22 where it passes through the interior of the optical baffel tube 38 and impacts on subreflector 18, the interior surface of the entry window or lens 14, and eventually on the main reflector 16. In order to prevent the accumulation or penetration of moisture into the interior of the telescope 10, a dehydrator 40 is installed through the port 22 and supported in place in the interior of the telescope 10.

The structure of a dehydrator 40 constructed according to the principles of the present invention, is illustrated in further detail in FIG. 2. In FIG. 2, the dehydrator 40 is shown having a cylindrical sidewall or support tubing 42, an end cap 44, a barrier 48, and a desiccant holder 50. The outer cylindrical wall 42 comprises one of many materials including, but not limited to, extruded, injection molded, or cast plastics, casting resins, and metal tubing. It is preferred that the material comprising the cylindrical housing 42 comprises a plastic material such as an acrylic polymer or polyethylene based material due to a low thermal conductivity. The plastic materials are, thus, preferred since they do not tend to accumulate moisture during exposure to air. A period of exposure occurs just prior to insertion of the dehydrator into the telescope 10 or upon removal for storage. In some applications the material forming the cylindrical wall 42 comprises a substantially translucent or transparent material so that interior portions of the support tubing can be observed for reasons described below.

The sidewall 42 preferably comprises a cylindrical wall having an outside diameter on the order of 1 to 1.5 inches. The diameter used depends on the opening or clearance provided by the port 22 and the interior diameter of the baffel tube 38 at its narrowest point. The wall 42 is made thick enough to support the weight of the desiccant and other apparatus as described below for a chosen material and to provide a reasonably rigid structure. The wall 42 must not have a large degree of flexture available or else it will allow the desiccant to strike the sides of the baffel tube 38 which can damage the surface or the dehydrator 40. A typical wall 42 thickness is about 0.125 to 0.25 inches although this varies with the materials used.

The length of the sidewall 42 depends on the length of the baffel tube 38 which varies according to the size of the telescope between about eight to twenty-two inches in length from the end wall 20 to the end adjacent the sub-reflector 18. Therefore, the sidewall 42 is made long enough to place any desiccant outside of the baffel tube 38, or on the order of eight to twenty-two inches in length. Alternatively, the sidewall 42 can be constructed from smaller sections which are joined together by slip joints or threaded extensions so that the sidewall 42 length is adjustable by the dehydrator user for various optical equipment or telescope sizes.

Those skilled in the art will readily understand that alternate cross-sectional shapes, such as square or elliptical, can be employed for the sidewall 42 as well as other dimensions provided that the maximum width presented by the sidewall 42 fits through the port 22 or the baffel tube 38. The cylindrical sidewall configuration is preferred as more cost efficient and simpler to manufacture and assemble.

Secured on one end of the support sidewall 42 is a desiccant cage or holder which comprises a generally cylindrical sidewall which is closed on one end by an end wall. The other end of the cylindrical sidewall 52 is open and is joined to the support sidewall 42 using one of several possible means. An exemplary holder 50 is on the order of 1 to 1.5 inches in diameter and about 3 to 4 inches in length.

If the inner diameter of the sidewall is wider than the outer diameter of the sidewall 42, then the desiccant cage can be positioned over the wall 42 and secured in place using fasteners such as screws or bolts through the sidewalls 42 and 52. In this particular configuration, it is considered advantageous to provide at least one keyway along one portion of the sidewall 42 which mates with a ridge or key on the interior of the holder 50 to prevent rotation during installation and removal of the holder 50.

The wall 52 of the holder 50 has a series of apertures or slots 56 which allow movement of air between the interior and exterior of the holder 50. In the alternative, a mesh or grid-like material can be used to form the walls of the holder 50. The exact dimensions of the slots are not critical to the operation of the invention, but should be large enough, or the slots numerous enough, to provide a reasonably high, access or a short mean free path for air molecules circulating within the interior of the telescope 10. The object is to assure that a sufficiently large amount of moisture circulating with the air within the telescope 10 will be exposed to the interior of the desiccant holder 50.

Positioned within the desiccant holder 50 is one or more desiccant containing packages 58. Containers 58 comprise small bags or pouches made from a variety of textile materials which hold and confine a desiccant such as silica gel. Material comprising the walls of a desiccant container 58 should be fairly porous to moisture while reasonably impervious to the desiccant to be contained therein. At the same time, the desiccant contained within the desiccant container 58 should be of a fairly small granular or powder form in order to maximize the surface area and, therefore, the absorption rate of the desiccant. The preferred embodiment contemplates the use of a silica gel as a desiccant although other types of desiccants may be employed without deviating from the teachings of the present invention.

In the alternative, the desiccant can comprise a solid or non-granular material. In this configuration the desiccant is configured to fit within the holder 50 without the aid of a container 58. When using a block of desiccant or moisture absorbing material it is also possible to attach the desiccant directly to the support wall 42 using the previously described techniques including drilling and tapping mounting holes. However, due to physical changes occasioned by water absorption including strength and rigidity, it is generally preferred to confine the desiccant within a holder 50.

When a granular desiccant is employed it is also possible to provide a plurality of baffles in the holder 50 to confine the desiccant without the aid of a container 58.

To provide an additional advantage in the use of desiccant material, an end plug 48 is positioned across the diameter or the opening of the support tubing 42 adjacent the open end of the desiccant holder 50. The end plug 48 is substantially impervious to moisture and provides a moisture tight seal of one end of the support tubing 42 and the holder 50. The basic structure of the dehydrator 40 is completed by the application of an end cap 44 on the other end. This creates an enclosed volume 60 within the dehydrator 40 which can be utilized to store unexposed desiccant or desiccant containers 58 dependent upon the dimensions chosen for the various materials.

The end cap 44 has a cylindrical projection on one face which has an external diameter slightly smaller than the internal diameter of the support tubing 42. The end cap 44 is inserted into an end portion of the support tubing 42 and held in place using one of several fastening means such as screws, bolts, threaded surfaces or adhesive type materials. When the end cap 44 is removably attached to the support tubing 44 it can be temporarily removed and new desiccant or desiccant containing containers 58 removed from the volume 60 to recharge the desiccant holder 50.

During use, the desiccant absorbs moisture from air passing through the desiccant holder 50 and, therefore, absorbs moisture from the interior volume of the telescope 10. This has the desired effect of preventing a build up of moisture on the interior surfaces, and optics, of the telescope 10, as well as removing some moisture already present on those surfaces.

A further advantage can be achieved in the present invention by utilizing some form of humidity or moisture indicator in association with the desiccant. If an indicator such as a colored litmus material is applied to the desiccant containers 58 or the desiccant material contained therein, one may visually observe the relative humidity of the desiccant material. This allows users of the dehydrator 40 to observe the relative humidity of the desiccant material or the relative efficiency still available for the material and make an informed decision as to when that desiccant material should be removed from the holder 50 and recharged or discarded. At this point a dehydrator 40 user may also observe the stored desiccant or desiccant containers 58 within the support tubing 42 to note whether or not they are still in a high efficiency of absorption state and thereby decide to utilize that material as a replacement.

The dehydrator 40 is generally held in place on the larger reflective type telescopes of the eight to twenty-two inch diameter variety, utilizing a compression type ring 34 provided for the telescope optics assembly 24. That is, typical telescopic focusing elements for this variety of telescope utilize an annular ring 34 which tightens down on a set of threads positioned about the port 22 and presses against a washer, or compression ring 36 to secure the tubular body portion of the optics 24 in place. This type of arrangement may be used to great advantage for the dehydrator 40 when the end cap 44 is manufactured with the same approximate dimensions as utilized by existing securing rings 36. Therefore, the dehydrator 40 can be used without modification in many telescopes.

This is illustrated in further detail in FIG. 3, where the dehydrator 40 is shown inserted into the telescope 10 until the end cap 44 encounters the raised surface or boss 32 positioned about the port 22. Preferably a resilient, and substantially moisture impervious, washer 36 is positioned between the raised surface 32 and the end cap 44 to provide a properly moisture resistant barrier between the exterior atmosphere and the interior of the telescope 10. A handle 46 disposed on a back surface of the cap 44 allows for maneuvering the dehydrator 40 into and out of the port 22.

What has been described is an application of the dehydrator 40 for a typical class of telescopes utilizing a capture or compression ring or washer seal to hold optical elements in place. However, there are additional classes of telescopes which utilize alternative methods of securing an optics assembly 24 in place such as a sliding sleeve seal as illustrated in FIG. 4.

In FIG. 4, a telescope 10' utilizes a sliding eyepiece holder 64 on the inner circumference of the port 22'. The sliding eyepiece holder 64 is utilized to hold an eyepiece 24' (not shown) which is inserted within the holder 64 and moved back and forth to adjust for focal range and depth. For the purposes of the present invention, an adaptor sleeve 66 may be inserted into the eyepiece holder 64 in order to accommodate variations in the diameters between the exterior of the dehydrator 40 and the interior of the eyepiece holder 64. The sleeve 66 may also be made of materials which improve the frictional dynamics of the eyepiece holder for insertion of the dehydrator 40. That is, materials such as polyfluorohydrocarbon or a metal with a coating of such material are preferably used for the adaptor sleeve 66 in order to reduce friction and dragging by the dehydrator 40 or damage to the interior surface of the eyepiece holder 64. In this configuration the dehydrator 40 is slipped into the inner diameter of the sleeve 66 and projects on down the eyepiece holder 64 and into the interior of the telescope 10. It is not necessary that the adaptor 66 project the entire length of the eyepiece holder 64 or the dehydrator 40 but merely that it occupies a sufficient length of the eyepiece 64 to provide the necessary protective function or support. As before, a resilient washer 62 is provided adjacent to the end cap 44 in order to provide a moisture resistant barrier once the dehydrator 40 is moved into position.

While the present invention, as described, provides a method and apparatus for preventing the build up of moisture on the interior of large diameter optical refelctive telescopes, it is reduced in scale to match small telescopes or optical equipment. That is, the use of an elongated support tube 42 is beneficial where it is necessary to position the desiccent holder 50 at the end of a baffel tube which is on the order of eight to twenty-two inches long. However, the use of such a long support is improper or undesirable when the baffel tube or associated optics only extend a couple of inches into the interior of the telescope or optical equipment.

This is especially true for optical equipment other than telescopes where long optical paths are not required or are replaced by multi-fold arrangements. For this type of application, the support tube 42 may be removed from the structure of the present invention and the end cap 44 placed directly on the otherwise open end of the desiccant holder 50. This alternate embodiment, which is especially useful for small scale optical equipment, is illustrated in FIG. 5.

In FIG. 5, a dehydrator 70 is illustrated having an end cap 44' with its associated handle 46' and resilient washer 36' as previously described. The main body of the dehydrator 70 comprises a cylindrical tube or wall 72 which can have a series of apertures in it similar to the desiccant holder 50 but preferably comprises a solid surface. The end of the dehydrator 70 opposite the end cap 44' comprises a circular opening which is closed off using a special membrane 74 held in place by a retaining ring 76. The retaining ring 76 comprises an annular ring whose exterior diameter is slightly smaller than the interior diameter of the sidewall 72. The material 74 is stretched over the ring 76 which is then pressed into place inside the tubing 72 where it is held in place by the frictional force between the material 74 and the mating surfaces of the tubing 72 and the ring 76. The material 74 is preferably a textile or fine wire mesh material which is very porous to air and moisture surrounding the dehydrator 70 while being substantially impervious to the movement of desiccant material 80 which resides on the interior of the dehydrator 70.

For the configuration of FIG. 5, the end cap 44' is removed from the tubing 72 and an interior volume 82 filled with a desired amount of desiccant material 80. As before, the desiccant material 80 can comprise a variety of material and material types such as granular or single piece blocks.

Once the end cap 44' is replaced on the tubing 72, the dehydrator 70 is inserted into the telescope or optical equipment. If the tubing 72 is made of a substantially transparent material, then a moisture sensitive coating on the desiccant material 80 will allow visual inspection and determination of the remaining moisture absorbing capacity for the desiccant material 80 as before.

This latter configuration is also useful when a separate access port, such as on the side of optical equipment or a telescope, is provided which does not require a large support member to clear any optical shields or baffel tubes.

What has been described then is a new method and apparatus for controlling moisture in telescopes and similar optical equipment.

The foregoing description of preferred embodiments has been presented for purposes of illustration and description. It is not intended to be exhaustive nor to limit the invention to the precise form disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What we claim is:

1. A dehydrator for optical apparatus having an enclosure defining an interior volume with at least one access port and reflective optical surfaces disposed therein, comprising:
    a desiccant holding means for confining a predetermined volume of desiccant in a fixed volume with a predetermined amount of access to air within said optical apparatus; and
    a support means for removably supporting said desiccant holding means within said interior volume of said optical apparatus adjacent a portion of said optical surfaces, said support means comprising an extension member for insertion through and securing in said access port.

2. The dehydrator of Claim 1, wherein said extension means compreses a tubular member for insertion through and securing in said access port.

3. The dehydrator of Claim 1 further comprising interface means coupled on one end of said extension member for interfacing with said access port and holding said support means in place in said access port.

4. The dehydrator of Claim 1 wherein said support means further comprises viewing means for observing an interior portion thereof.

5. The dehydrator of Claim 1 wherein said support holding means comprises indication means for visually indicating a relative moisture content of said desiccant.

6. The dehydrator of Claim 1 wherein said desiccant holding means further comprises indication means for visually indicating a relative moisture content of said desiccant.

7. The dehydrator of Claim 5 wherein said indication means comprises an enclosure having apertured walls.

8. The dehydrator of Claim 1 wherein said holder means comprises an enclosure having apertured walls.

9. The dehydrator of Claim 7 wherein said apertured walls comprise a screen mesh material.

10. The dehydrator of Claim 7 wherein said apertured walls comprise a cylindrical wall having an end wall secured thereto on one end and a plurality of slots disposed thereon for the passage of air therethrough.

11. The dehydrator of Claim 1 wherein said optical surfaces include a main reflector and a sub-reflector positioned in spaced apart relationship with a baffel tube in a central location on said main reflector pointing toward said sub-reflector; and said support means comprises an extension member for supporting said holding means substantially outside of said baffel tube adjacent said sub-reflector.

* * * * *